United States Patent [19]
Baron et al.

[11] Patent Number: 5,809,481
[45] Date of Patent: Sep. 15, 1998

[54] ADVERTISING METHOD AND SYSTEM

[75] Inventors: David Baron, 85 Miller Rd., Kinnelon, N.J. 07405; Brian Tarpey, Wayne, N.J.

[73] Assignee: David Baron, Kinnelon, N.J.

[21] Appl. No.: 694,201

[22] Filed: Aug. 8, 1996

[51] Int. Cl.[6] ............................. G06F 17/48; G06F 19/00
[52] U.S. Cl. .............................................. 705/14; 705/10
[58] Field of Search ................................... 705/14, 1, 10; 283/70, 80, 81, 88

[56] References Cited

U.S. PATENT DOCUMENTS

| | | | |
|---|---|---|---|
| 4,271,352 | 6/1981 | Thomas | 235/375 |
| 4,872,113 | 10/1989 | Dinerstein | 705/10 |
| 5,180,192 | 1/1993 | Herbert | 283/101 |
| 5,237,157 | 8/1993 | Kaplan | 235/375 |
| 5,482,753 | 1/1996 | Langan et al. | 428/40.8 |
| 5,636,346 | 6/1997 | Saxe | 705/1 |

Primary Examiner—Tariq R. Hafiz
Assistant Examiner—James W. Myhre
Attorney, Agent, or Firm—Felfe & Lynch

[57] ABSTRACT

A method and system for advertising that provides advertisers with a marketing database listing contact information for all potential consumers who received a promotional item from that advertiser and decided to retain the promotional item for future use. The promotional item is a tag bearing an advertisement, a contact identifier and a unique tag identifier. After receiving the tag from an advertiser, each recipient is instructed to attach the tag to a personal property item and to register the item with a processing facility that, with the use of an information storage and retrieval system, will create a master database comprising each recipient's contact information and tag identifier. The master database can be used to arrange for the return of a lost personal property item bearing a registered tag. The master database can also be sorted and contact information can be extracted therefrom to generate a marketing database for transmittal to advertisers.

3 Claims, 7 Drawing Sheets

| Tag ID | Salu-tation | First Name | Last Name | Address | City | State | Zip | Reg. Date | Advertiser |
|---|---|---|---|---|---|---|---|---|---|
| 11111 | Mr. | John | Smith | 123 Main Road | Anytown | NY | 10000 | 1/1/96 | Joe's Pizza |
| 11112 | Ms. | Jane | Doe | 456 Elm Street | Anycity | NY | 10001 | 1/26/96 | Anycity Auto Body |
| 11113 | Ms. | Jane | Smith | 789 Oak Avenue | Anycounty | NJ | 01110 | 12/2/95 | Mary's Cleaners |
| | xxx | xxx | xxx | xxx | xxx | xxx | xxx | xxx | |
| | xxx | xxx | xxx | xxx | xxx | xxx | xxx | xxx | |
| | xxx | xxx | xxx | xxx | xxx | xxx | xxx | xxx | |
| | xxx | xxx | xxx | xxx | xxx | xxx | xxx | xxx | |
| | xxx | xxx | xxx | xxx | xxx | xxx | xxx | xxx | |
| | xxx | xxx | xxx | xxx | xxx | xxx | xxx | xxx | |
| | xxx | xxx | xxx | xxx | xxx | xxx | xxx | xxx | |

Figure 5.

| Salutation | First Name | Last Name | Address | City | State | Zip | Reg. Date |
|---|---|---|---|---|---|---|---|
| Mr. | John | Smith | 123 Main Road | Anytown | NY | 10000 | 1/1/96 |
| xxx | xxx | xxx | xxx | xxx | xxx | xxx | xxx |
| xxx | xxx | xxx | xxx | xxx | xxx | xxx | xxx |
| xxx | xxx | xxx | xxx | xxx | xxx | xxx | xxx |
| xxx | xxx | xxx | xxx | xxx | xxx | xxx | xxx |
| xxx | xxx | xxx | xxx | xxx | xxx | xxx | xxx |
| xxx | xxx | xxx | xxx | xxx | xxx | xxx | xxx |
| xxx | xxx | xxx | xxx | xxx | xxx | xxx | xxx |
| xxx | xxx | xxx | xxx | xxx | xxx | xxx | xxx |
| xxx | xxx | xxx | xxx | xxx | xxx | xxx | xxx |

ADVERTISING METHOD AND SYSTEM

FIELD OF THE INVENTION

The present invention relates generally to the field of marketing and advertising. More specifically, this invention relates to a method and system of promotional advertising wherein an advertiser, wishing to promote its goods or services, sponsors a lost article registration and return service in exchange for distribution of its advertisement and receipt of a computer-generated marketing database list.

BACKGROUND OF THE INVENTION

In the fields of marketing and advertising, the ultimate goal of most advertisers is to cost-effectively increase sales of their goods or services. Therefore, a particular advertisement or advertising campaign is deemed successful if it results in an increase in sales and revenue, net of advertising costs. The question of whether a specific ad campaign is effective, can generally be determined by evaluating its effect on factors such as, customer loyalty, brand name recognition and brand name distribution.

Many different marketing and advertising schemes have been devised and broadly implemented in an effort to find the most effective and least costly way of increasing sales. One popular form of advertising is display advertising. Display advertising is widely used because of its inherent ability to reach a broad range of potential customers. Although widely used, display advertising is limited in that an advertiser cannot accurately gauge the success of any particular display ad. For example, an advertiser may have decided to place his or her advertisement onto a billboard located along-side a busy highway. A typical billboard ad may have cost thousands of dollars. The return for the advertiser's investment is the likelihood that many potential customers may see the billboard each day as they drive past it on the highway. From the advertiser's perspective, the mere fact that many people see the ad serves as a basis for the hope that the ad is effective. The advertiser, however, does not have any precise means for estimating how much business has increased due to a particular display ad. This inability of evaluating the effect of a display ad stems from the fact that it is difficult to know how many people have seen the ad. More importantly, it is difficult to assess how many people out of all who have seen the ad, are potential customers for the advertised product or service. With display ads, it is inevitable that a large percentage of people viewing a particular ad have never used the advertised product or service and will never use the product despite having seen it advertised. This limitation of display ads, therefore, can be attributed to the random composition of most audiences that see display ads.

More effective display ads are generally those that advertise products or services that are targeted to a particular audience. For example, sportswear companies may target potential customers at sporting arenas and stadiums, whereas cereal companies may advertise in supermarkets.

Advertisers have implemented various schemes to display their advertisements to targeted groups of consumers. For example, U.S. Pat. No. 5,487,203 for a "Squeegee Having an Advertising Display Area" describes a squeegee handle having polygonal sides that function as a display advertising space. An advertisement displayed on such squeegee handle is targeted to gas customers using a credit-card point of sale gas pump terminal. The rational is that a customer, pumping gas, will see an ad on the squeegee handle for a product that is sold inside the gas station convenience store and thus be prompted to purchase the advertised product. This is one example of how display advertisements can be focused to a targeted group of potential consumers.

Other forms of advertising have also been implemented to remedy limitations of display advertising. Television ads, for instance, are used by advertisers in an attempt to reach a targeted group of potential consumers. To help advertisers gauge the composition of an audience that may see a particular ad, television networks rely on assessing ratings and demographics data. These audience indicators, however, are not precise and are only marginally effective. Various improvements upon typical television advertisements have been patented. For example, U.S. Pat. No. 5,392,066 for an "In-store Advertising System" describes how commercials can be broadcast to remote locations inside retail stores for point-of-purchase viewing by potential customers. The rational, once again, is to direct an advertisement to a targeted audience.

Another form of advertising intended to reach a targeted group of potential consumers is direct mail advertising. In this form of advertising, products or services offered by advertisers are described in literature which is sent by mail to various prospective customers. Most direct advertisements also contain some means by which an ad's recipient can indicate to the advertiser that the ad has generated interest. Some direct mail ads enclose coupons that are intended to be presented to the advertiser at the time of a purchase. Other types of direct mail advertisements include various response cards that are intended to be returned to the advertiser. A limitation to most such direct advertisement schemes is the difficulty of ascertaining the demographics of potential customers who did or did not respond to the advertisement. These limitation and a proposed solution are discussed in U.S. Pat. No. 4,752,675 for a "Method of Collecting Response Data from Direct Mail Advertising," which describes a method for keeping track of results from a direct mail ads. This patent illustrates the importance for advertisers to receive feedback from potential consumers regarding the advertisement they have seen.

It is well recognized that a display advertisement is more effective if it is seen by the same person more than once. In that regard, advertisers have implemented various display ad schemes wherein a display ad is appended to a useful item that is kept by a potential consumer for continued reference. For example, U.S. Pat. No. 4,957,311 for a "Direct Mail Advertising System" describes a system wherein a bulk-mail card bearing a display ad provides useful information pre-printed on a portion of the card such that the card would be retained by its recipient for continued reference. This patent illustrates that an advertisement is generally more effective if it is retained by a potential consumer for frequent use and/or reference.

A key limitation of this and similar patented systems, however, is that it is difficult for an advertiser to assess whether the pre-printed information will be deemed useful by each recipient of the card. To improve the likelihood that the pre-printed information will be found useful by a greater percentage of the ad's recipients, an advertiser may want to direct the bulk mailing to individuals having some common interests. To do so, an advertiser may implement a targeted mailing list of individuals having common interests and direct the pre-printed information, as well as the ad, accordingly. Such mailing lists, however, have inherent limitations because an advertiser still cannot precisely assess how many recipients of the ad will be interested enough in the pre-printed information to retain the bulk-mail card, Promotional advertising is another form of targeted advertising. In promotional advertising an advertiser distributes to potential consumers, some free promotional item bearing a display ad associated with the advertiser's products or services. The distribution is generally conducted by mail. Sometimes, the promotional items are distributed by hand at supermarkets, public events, or other similar locations where many potential consumers for a particular product or service are gathered. The rationale underlying promotional advertising is that potential consumers having received a free gift, will retain that gift for their personal use and as a consequence would frequently see the advertisement displayed thereupon.

The effectiveness of a promotional advertising campaign generally depends on many of the same factors as does direct mail advertising. A key factor in each, is an advertiser's ability to accurately assess the interests of a group of potential consumers and to select the type of promotional items, reference information and ads, accordingly. Ultimately, an advertiser would like to be assured that each individual having received a promotional item would retain that item for subsequent reference and/or use. Two approaches can be implemented to increase the effectiveness of promotional advertising. The first approach focuses on selecting a group of potential consumers that would consider a particular, preselected, promotional item to be useful. The second approach, conversely, focuses on selecting a promotional item whose utility appeals to a broad group of potential consumers. A combination of these two approaches would lead to an even more effective promotional advertising campaign.

The present invention combines these two approaches and resolves the above-mentioned limitations of display advertising, direct mail advertising and promotional advertising by providing advertisers with a useful promotional item for distribution and with a marketing database containing contact information for each recipient of the promotional item who has retained it for personal use. The promotional item of the present invention is a lost personal property identification, registration and return system.

In general, lost property return systems and related devices are not new in the art. U.S. Pat. No. 5,180,192 to Herbert considers various such systems and proposes an improvement thereupon. The Herbert patent is directed to a method for returning lost personal accessory items via the U.S. Mail to their owners without breach of security. The Herbert patent's method is primarily intended for use with key-rings and relies exclusively on the U.S. Mail system for the return of lost items. This patent, therefore, is inherently limited in its application to personal items small enough to fit inside a standard mi deposit box.

U.S. Pat. No. 4,271,352 to Thomas describes a property return system that utilizes coded ID tags and the interest banking system to return lost items to their proper owners. A key element of the Thomas system is that the identity of each individual using the return system is maintained confidential to everyone except for the lost item return center. The Thomas patent also describes various types of ID tags and methods for encoding same using technology such as punched tape, optical character recognition, embossed character recognition, and electronically programmable semiconductor memory. The Thomas patent is limited in its reliance on the banking system as well as on its implementation of a reward system that compensates both the finder and the banking industry return point responsible for sending the lost item back to its owner.

The property return system of the present invention is distinguishable over the systems described in the Herbert and Thomas patents in many respects. The present system not only provides for the return of lost items to their proper owners, but also serves the basis for a comprehensive advertising scheme. The present system is also distinguishable in that it can be applied to personal items of any size, not just small items as described in Herbert. Other distinctions between the present invention and the above-cited prior art will become apparent as the present invention is described in more detail below.

SUMMARY OF INVENTION

The present invention relates to an advertising system and method that: (1) provides an advertiser with a useful promotional item to be distributed to individuals in that advertiser's target market of potential consumers; (2) provides an advertiser's potential consumers with a useful system for identifying, registering and retrieving lost personal property items; and (3) provides an advertiser with a marketing database, customized to that advertiser's specifications, containing contact information for recipients of the promotional item from that advertiser.

The useful item intended to be distributed as part of the present invention is an identification tag, having an advertisement, a unique tag identifier and a contact identifier of a processing facility that can be contacted in the event the tag is found. The tag is intended to be distributed by an advertiser to individuals from a targeted group of potential consumers. The tags' recipients are then intended to attach the tag to a personal item. The tags' recipients are also intended to register their tag identifier and corresponding personal contact information with a processing facility that will incorporate such information into an information storage and retrieval system. If a personal item bearing a tag is found, its finder is prompted by the tag's contact identifier to contact the processing facility to report the find. The finder can report the found item by referring to its tag identifier. The processing facility will then match the tag identifier of the found tag to its corresponding contact information stored in the information storage and retrieval system, and accordingly arrange for the found item to be picked up from the finder and returned to its proper owner.

The information storage and retrieval system will also be used to compile a master database of all registered consumers' contact information. The master database can be sorted and specific information can be extracted to generate a customized marketing database according to the specifications of any individual advertiser. This customized marketing database will then be communicated to an advertiser for that advertiser's potential use for a direct mail advertising campaign. The marketing database distributed to each advertiser can include contact information about consumers who have received a tag bearing that particular advertiser's display ad.

It is thus an object of the present invention to provide advertisers with a useful promotional item for distribution, that would appeal to a broad range of potential consumers.

It is a further object of the present invention to provide advertisers with feedback from potential consumers having received the useful promotional item.

It is a further object of the present invention to generate a master database containing contact information for all consumers having received and responded to a promotional advertisement.

It is a further object of the present invention to provide advertisers with a customized marketing database that lists the names and addresses of each consumer who responded to a particular promotional advertisement campaign. This marketing database is intended to be used by advertisers as a basis for subsequent direct mail advertising campaigns.

It is a further object of the present invention to provide consumers with a lost property registration, identification and return system whereby lost property identified by an ID tag will be returned to its proper owner in the event the property is found.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention. It should be recognized by those skilled in the art that the specific embodiments disclosed herein may be readily modified for carrying out the same purposes as that of the present invention. Such equivalent constructions should not be deemed to depart from the spirit and scope of the present invention as set forth in the appended claims.

BRIEF DESCRIPTION OF THE DRAWINGS

The present invention is further described in detail below with reference to the accompanying drawings, in which.

DETAILED DESCRIPTION OF THE PREFERRED EMBODIMENTS

Figure 1:
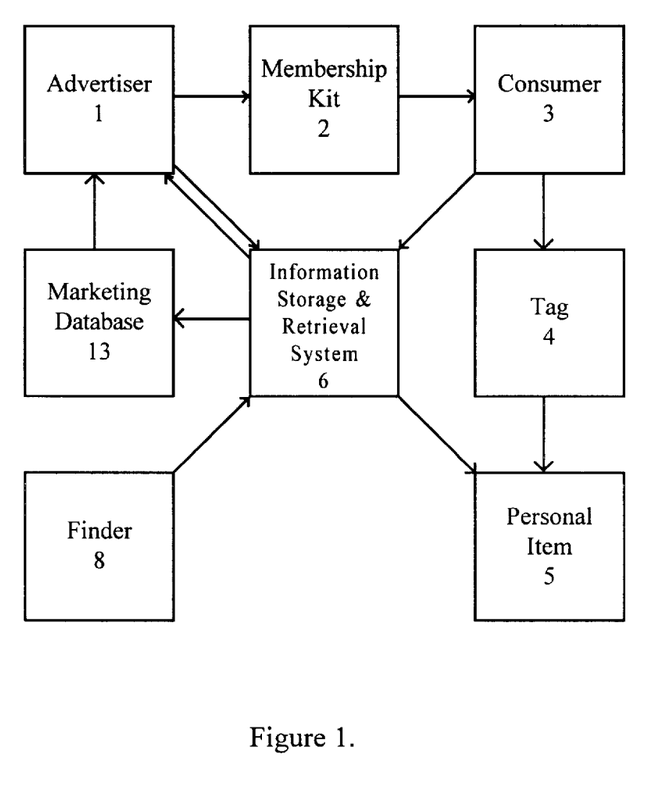
FIG. 1 illustrates an overview schematic block diagram of the present advertising system.
Figure 2:
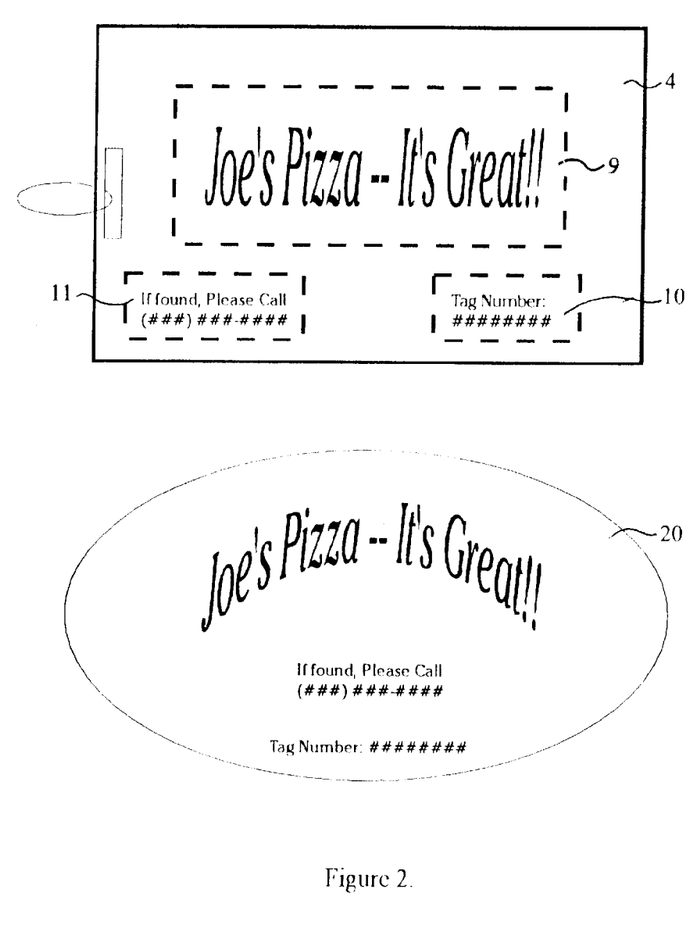
FIG. 2 illustrates a front view of different types of tags, each of which can be implemented in the present advertising system and method.
Figure 3:
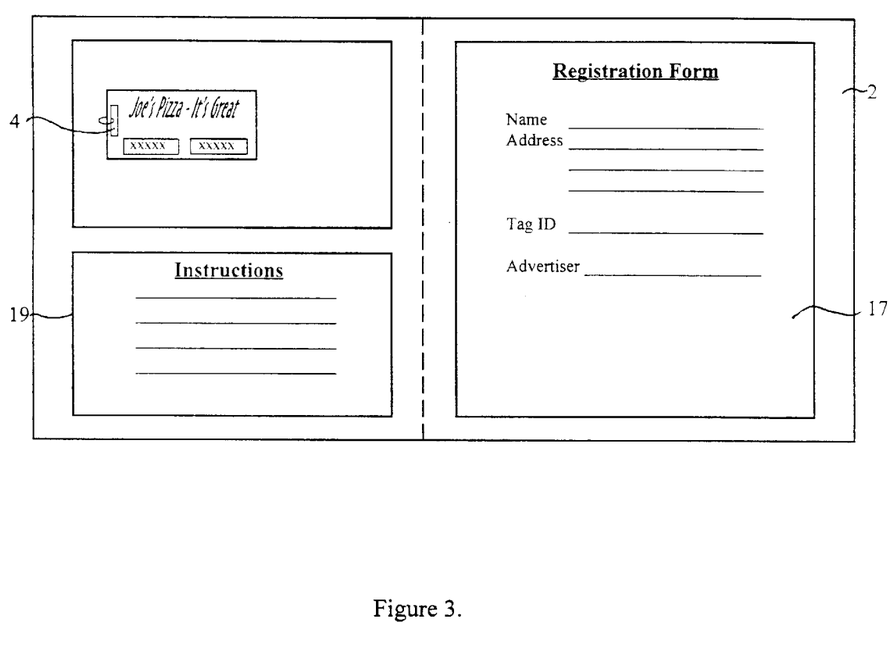
FIG. 3 illustrates an open view of a membership kit.
Figure 4:
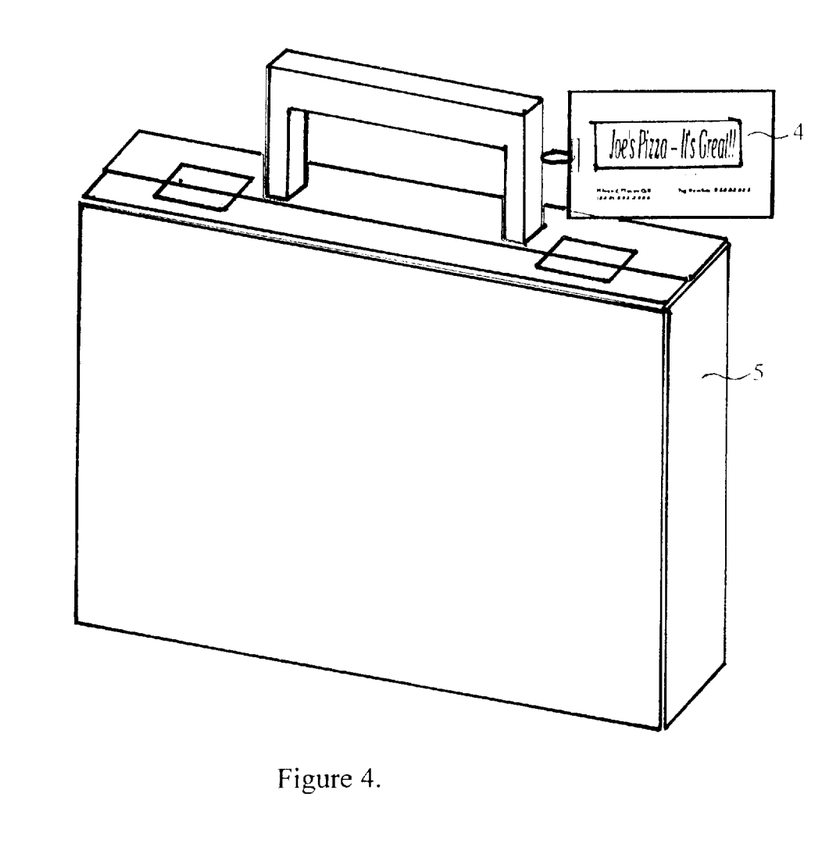
FIG. 4 illustrates a perspective view of a tag attached to a personal property item.

FIGS. 1 through 7 illustrate the preferred embodiment of the present invention. FIG. 1 shows an overview block diagram which illustrates the key elements of the preferred embodiment. According to FIG. 1, an advertiser 1 distributes at least one membership kit 2 to a potential consumer 3. The consumer detaches a tag 4 contained in the membership kit 2 and attaches the tag 4 to a personal item 5, as shown in FIG. 4. The consumer also registers the membership kit 2 with a processing facility that implements an information storage and retrieval system 6 to maintain the registration information. If a personal item 5 bearing a tag 4 is found by a finder 8, the finder 8 can contact the processing facility which will arrange for the found item to be returned to its proper owner. Registration of a tag may involve a registration fee. It is anticipated, however, that the advertiser 1 will sponsor each consumer's 3 registration fee. The information storage and retrieval system 6 will also use the stored registration information to generate a marketing database 13 which will be provided to an advertiser 1. By analyzing the marketing database 13, an advertiser 1 can gauge the success of a particular advertising campaign. Similarly, an advertiser 1 can use the marketing database 13 as a mailing list for subsequent direct mail or other advertising campaigns.

Each of the above elements of the present invention will now be described in detail with reference to FIGS. 2 through 7.

An advertiser 1 distributes membership kits 2 to potential consumers 3 in the advertiser's target market of consumers. Membership kits 2 may be distributed by any other means elected by an advertiser 1 that would reach potential consumers 3 in the advertiser's target market. For example, an advertiser 1 may elect to distribute membership kits 2 at the advertiser's place of business, in the street, at public events, by direct mail, or by any other similar means.

FIG. 3 illustrates a sample membership kit 2, which contains at least one tag 4, a registration form 17, and instructions 19.

FIG. 2 illustrates two sample embodiments of a tag, a solid tag 4 and a label-type tag 20. The first embodiment, is a solid tag 4 having an attachment means such as a key ring, hoop, link chain, or the like, for attaching the solid tag 4 to a personal item 5 in the manner illustrated in FIG. 4. The second embodiment, is a label-type tag 20 that has an adhesive surface similar to that of a sticker, such that the label-type tag 20 can be adhered to a personal item 5. Various other tag embodiments are known in the art and can easily be implemented with the present invention.

Each tag 4 or 20 has three portions, as shown in FIG. 2. The first portion bears an advertisement 9. The second portion bears a contact identifier 11 for a processing facility to be contacted by a finder 8 in the event a tag 4 is found. The third portion bears a unique tag identifier 10, which particularly identifies each individual tag 4.

The advertisement 9 can be comprised of various known formats of display advertisements. For example, the advertisement 9 can be silk-screened, sewn, glued, painted, etched, or otherwise appended to a tag 4. The advertisement 9 does not necessarily have to advertise a commercial company, product or service. The advertisement 9 can include, for example, slogans or messages from organizations, charities, political parties, and the like. Additionally, it is anticipated that some advertisers may collaborate to advertise together on one tag. For example, a movie theater and a nearby restaurant may combine to place their respective ads onto one tag. Similarly, the present invention is ideally suited for co-operative advertising. In co-operative advertising, one company subsidizes or contributes to offset the advertising costs of another. For example, using the present invention, a local neighborhood hardware store may advertise its location as well as the fact that it carries a particular manufacturer's product. In exchange for the advertisement, the manufacturer will subsidize the hardware store's advertising costs.

While a personal item 5 bearing a tag 4 remains in the possession of its rightful owner, the advertisement 9 is prominently displayed and can be regularly seen by the consumer 3 and third parties. Thus, the advertiser 1 benefits from having its advertisement 9 regularly viewed by potential consumers 3 who appreciate having received a useful item free of charge.

The contact identifier 11 is used to identify the location and contact information of a processing facility to be contacted in the event a tag is found. The contact identifier 11 can include directions for a finder 8 such as, for example, "If Found, Please Call (xxx) xxx-xxxx."

The tag identifier 10 is a unique code used to particularly identify each tag. The tag identifier 10 of the preferred embodiment is a human or machine readable alphanumeric code comprising of at least one character. For example, a tag identifier 10 can be of the format XXXXX-YYYYY-ZZZZZZZ, wherein each "X," "Y," and "Z" represents an alphanumeric character. The tag identifier 10 can also be read using known optical character recognition methods.

A tag identifier 10 may be pre-coded to include a geographical area identifier, an advertiser identifier or other similar identifier. For example, in the described tag identifier 10 of the form XXXXX-YYYYY-ZZZZZZZ, the "X"s may represent a geographical area, the "Y"s may represent an advertiser and the "Z"s may represent a particular tag for each advertiser or geographical area. The tag identifier 10 can be appended onto a tag in any one of a variety of ways, including each method described for appending an advertisement 9 onto a tag 4. Each tag identifier 10 is unique.

Other embodiments of tag identifier 10 codes and coding means are known in the art and can easily be implemented with the present invention. Among the more recognized types of other codes are machine readable bar-codes or magnetic media codes, such as those implemented on magnetic swipe cards. Regardless of the coding means used on a tag 4, the correlation between a particular tag identifier 10 and its corresponding owner's contact information will be kept confidential by the processing facility. This secrecy will protect consumers in the event that security items such as house keys are lost.

The instructions 19 direct a consumer 3 to detach the tag 4 from the membership kit 2 and attach the tag 4 to any personal item 5, as shown in FIG. 3. The instructions 19 further direct the consumer 3 to register the tag 4 by filling out the enclosed registration form 17 and returning it to a processing facility having an information storage and retrieval system 6. The registration form 17 requires a consumer 3 to provide contact information 22 sufficient to enable the processing facility to contact that consumer 3 in the event his or her tagged property is found by a finder 8. The registration form 17 may require a consumer 3 to provide information about the advertiser 1 from whom that consumer received a membership kit 2. The registration form 17 may also request consumers 3 to provide additional information which could be useful for marketing purposes. For example, consumers 3 may be asked to provide demographics data, complete a product survey or provide a listing of consumer preferences.

When a registration form 17 is received by the processing facility, the registration information contained therein is entered into an information storage and retrieval system 6. Registration information includes each consumer's contact information, such as name and address, the corresponding unique tag identifier 10 and a corresponding advertiser identifier, which was precoded in the tag identifier 10 or supplied by the consumer 3.

Figure 7:
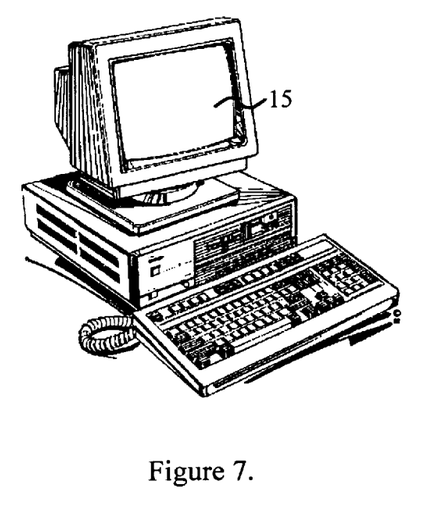
FIG. 7 illustrates an information storage and retrieval system.

The information storage and retrieval system 6 may be comprised of a personal computer 15, as shown in FIG. 7, operating any one of a number of commercially available database management software programs, such as, for example, "Paradox," "dBASE," "Access," or "Foxpro." The information storage and retrieval system 6 can equally use any one of a number of available spreadsheet software programs, including, "Lotus 1-2-3," "Excel," "Quattro Pro."

Figure 5:
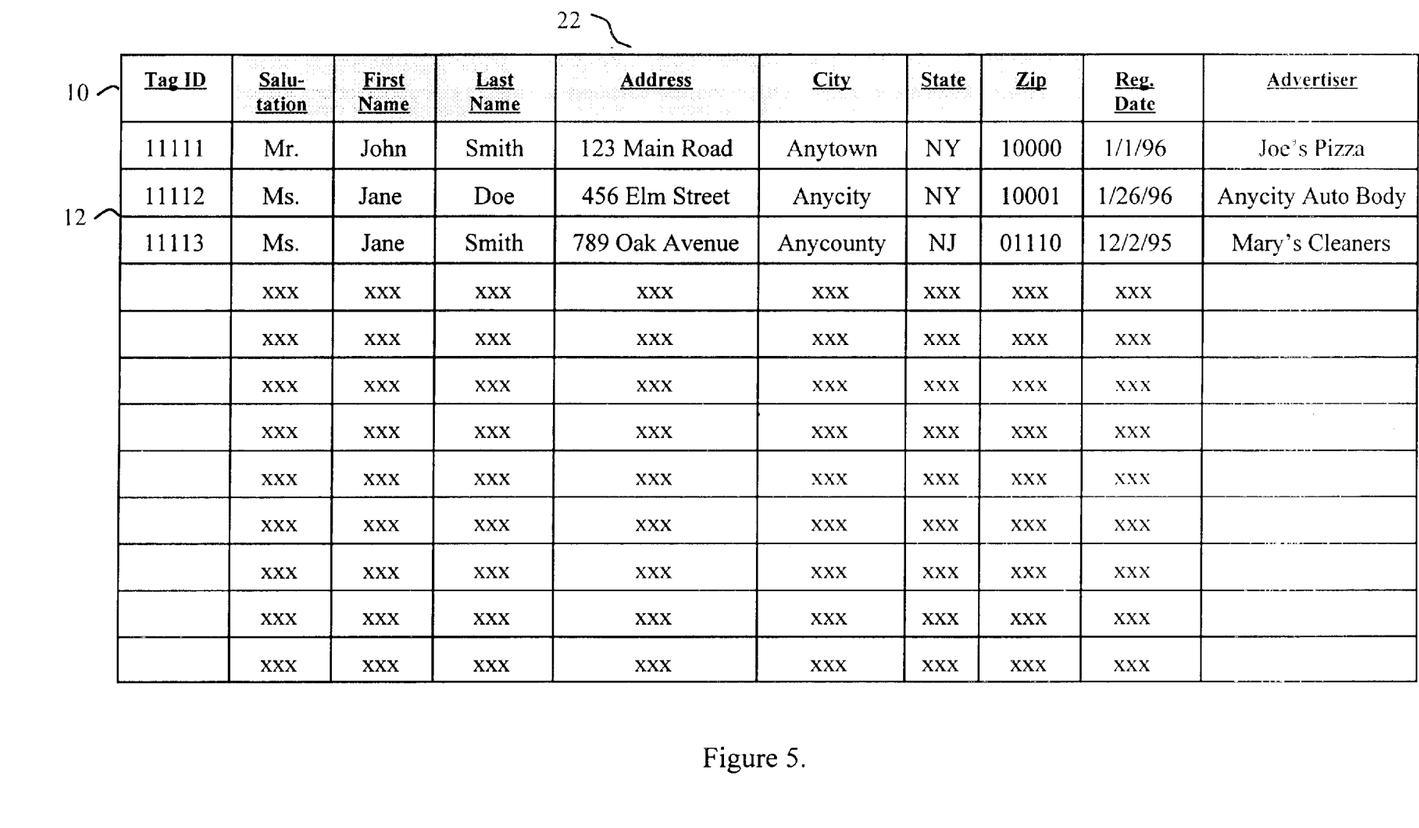
FIG. 5 illustrates a sample master database table.

Once at least one consumer's registration data is stored into the information storage and retrieval system 6, this data can be sorted using known data management techniques to generate a master database 12 of consumer information, as shown in FIG. 5. The master database 12 contains: (1) every registered consumer's contact information, such as name, address, telephone number, fax number, and Internet e-mail address; (2) the corresponding tag identifier 10; (3) the corresponding advertiser identifier; and (4) other relevant information, such as, for example, date of consumer registration, advertiser's address, number of kits distributed by an advertiser, or number of kits per consumer. The sample master database 12, shown in FIG. 5, contains the following data fields: (1) Tag Identifier; (2) Salutation; (3) First name; (4) Last Name; (5) Address; (6) City; (7) State; (9) Zip; (10) Registration Date; and (11) Advertiser Identifier. Each of these fields can be sorted using known data management techniques such as queries. Although the example in FIG. 5 shows that every registered consumer 3 and corresponding advertiser 1 is listed on one master database 12, it is anticipated that more than one master database 12 can be created. For example, a different master database 12 can be generated for various categories of consumers 3 or advertisers 1. Similarly, different master databases 12 can be created for various geographical areas or by different processing facilities.

The master database 12 will enable the processing facility to access each consumer's 3 contact information 22 based on the corresponding tag identifier 10, such that any consumer 3 can be contacted if his or her tagged personal item is found and reported to the processing facility. If a finder 8 locates a lost personal item 5 bearing a tag 4, the finder 8 is instructed by the contact identifier 11 to report the found items to a processing facility. When a lost personal item 5 is reported, the processing facility will ascertain from the finder 8 the tag identifier 10. The master database 12 will then be sorted, using known data management techniques, to correlate the reported tag identifier 10 with the contact information 22 of the lost tag's owner. Using this information, the processing facility can arrange for the found personal item 5 to be retrieved from the finder 8 and returned to its owner, the registered consumer 3. A finder 8 may be awarded with a reward.

Figure 6:
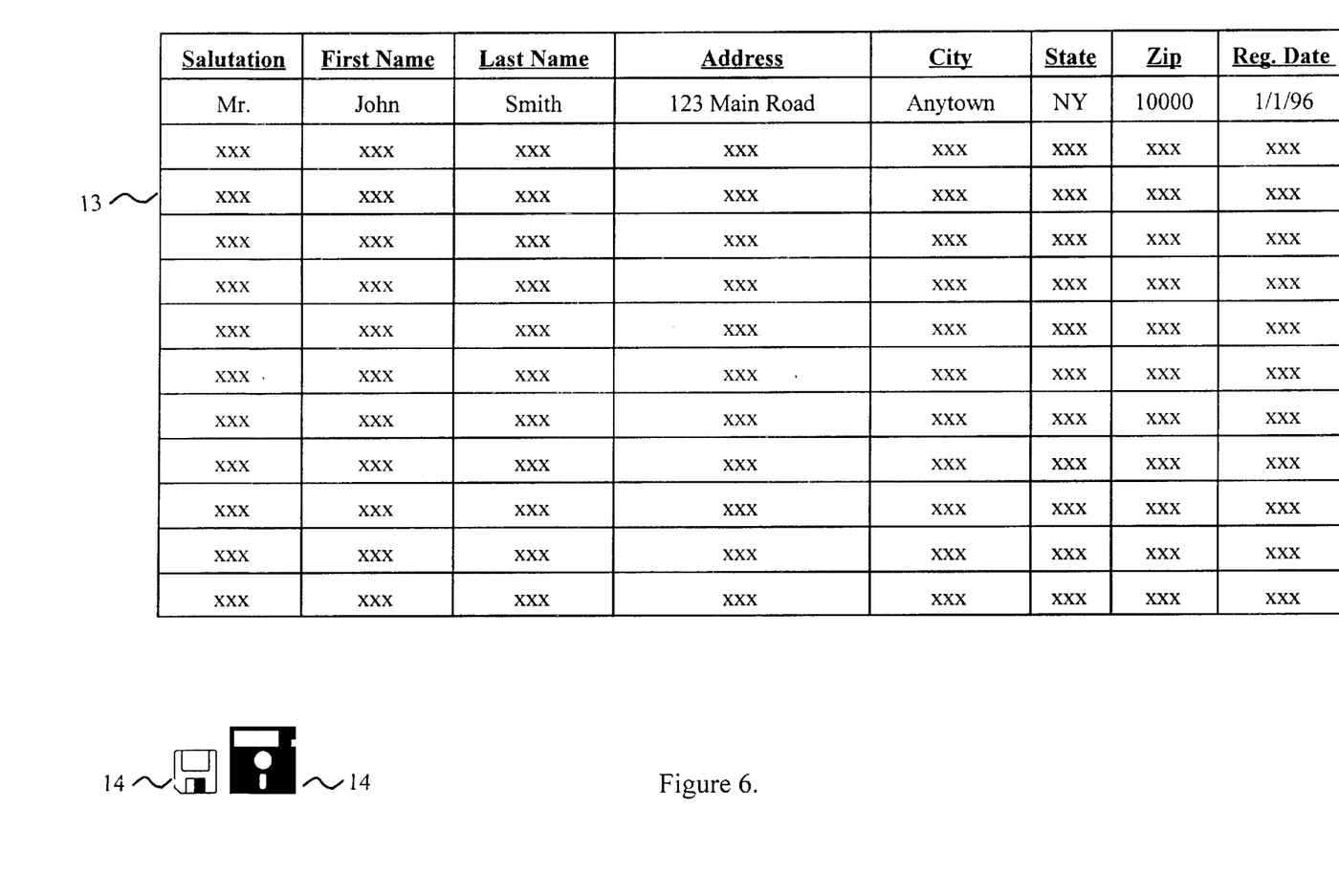
FIG. 6 illustrates a sample marketing database in printed and magnetic media formats.

In addition to using the master database 12 to return lost personal items to their owners, the master database 12 is also used to provide a marketing database 13 to advertisers who distributed membership kits 2 to consumers 3. A sample marketing database 13 is shown in FIG. 6. The marketing database 13 is a subset of the master database 12. While the master database 12 contains information about all consumers 3 and all advertisers 1, a marketing database 13 consists of contact information 22 for consumers 3 within a selected group, such as, for example, all consumers 3 having received their membership kits 2 from the same advertiser 1. By referring to a marketing database 13, an advertiser can ascertain how many consumers 3 to whom it distributed a membership kit 2, were interested enough in a promotion to register their tags. Additionally, the marketing database 13 provides an advertiser 1 with a list of potential consumers 3 to be contacted for subsequent direct mail or other advertising campaigns.

A marketing database 13 is generated by manipulating data contained in the master database 12 using known data management techniques such as queries. For instance, FIG. 6 shows a sample marketing database 13 generated for an advertiser named "Joe's Pizza." This sample marketing database 13 contains the following contact information 22 data fields: (1) Salutation; (2) First Name; (3) Last Name; (4) Street Address; (5) City; (6) State; (7) Zip; and (8) Registration Date. Some fields from the master database 12 will not included in a marketing database 13. Most importantly, tag identifiers 10 and their correlation to a particular consumer's contact information 22 will not be included in any marketing database and will be kept strictly confidential by the processing facility.

The sample marketing database 13 for "Joe's Pizza," shown in FIG. 5, was derived from the master database 12 shown in FIG. 5, which contains contact information 22 for consumers who received their membership kits from "Joe's Pizza," as well as from "Mary's Cleaners" and "Anycity Auto Body." The marketing database 13 for "Joe's Pizza," however, contains contact information 22 only for those consumers 3 who received a membership kit 2 from "Joe's Pizza." Similarly, a marketing database 13 can be generated for "Mary's Cleaners" or "Anycity Auto Body."

The marketing database 13 can be customized to meet a specific request of a particular advertiser 1. For example, an advertiser 1 can request a marketing database 13 containing the contact information 22 for all female consumers who reside in a particular zip code, who have received a membership kit 2 from that advertiser 1 and who registered within the past two years. Similarly, a different advertiser 1 may want a marketing database 13 containing contact information 22 for all consumers residing in a particular state who have received that advertiser's 1 membership kit 2 and registered within the past two weeks.

Individual advertisers 1, generally, will not be allowed to receive contact information 22 for consumers having received their membership kit 2 from a different advertiser 1. It is anticipated, however, that advertisers may want to receive a marketing database 13 containing contact information 22 for consumers having received their membership kits 2 from other advertisers. For example, "Joe's Pizza" may want a list of consumers 3 who received their membership kit 2 from "Mary's Cleaners." Such distribution of marketing databases 13 may be provided if advertisers agree to share information.

At all times the confidentiality of the correlation between each consumer's contact information and his or her unique tag identifier, will be strictly guarded and will not be compromised under any circumstances.

Once a marketing database 13 is generated, it can be transmitted to an advertiser 1 in a variety of standard printed formats, including: database reports; spreadsheet reports; mailing labels; and addressed envelopes. FIG. 5 shows a marketing database 13 printed in a spreadsheet format. A marketing database 13 can similarly be transmitted using various analog and/or digital media means, such as computer diskettes 14 or CD-ROM, in a variety of formats including: ASCII text; ASCII delimited text; generic word processor text file; generic database table file; specific database software file; and generic spreadsheet file. The marketing database 13 can also be transmitted in these electronic formats via modem, e-mail or other analog and/or digital communications means.

The advertiser 1 is intended to use the provided marketing database 13 as a way of gauging the response to a particular advertising campaign and as a source of mailing information for subsequent direct mail or other advertising campaigns.

It should be understood that the preferred embodiments and any examples described are for illustrative purposes only and are not to be construed as limiting the scope of the present invention which is properly delineated only in the appended claims.

We claim:

1. A method of advertising that provides an advertiser with a marketing database, said method comprising:

distributing at least one tag to each of a plurality of individuals, each tag having a first portion bearing an advertisement, a second portion bearing a contact identifier and a third portion bearing a tag identifier;

obtaining from each individual having received said tag, said tag identifier and contact information sufficient to contact said individual;

incorporating each said individual's contact information and corresponding tag identifier into an information storage and retrieval system to create a master database;

sorting said master database in correlation with each said tag identifier and extracting therefrom said contact information but not said corresponding tag identifier to generate a marketing database; and transmitting at least a portion of said marketing database to an advertiser whose advertisement appears on said first portion of said tag.

2. An method for developing a marketing database for each advertiser from a group of advertisers, said method comprising:

distributing at least one tag to each of a plurality of individuals, each tag having a first portion bearing an advertisement associated with at least one advertiser of said group, a second portion bearing a contact identifier and a third portion bearing an advertiser identifier associated with an advertiser whose advertisement appears on said first portion of said tag;

obtaining from each individual having received said tag, said advertiser identifier and contact information sufficient to contact said individual;

incorporating each said individual's contact information and corresponding advertiser identifier into an information storage and retrieval system to create a master database;

sorting said master database in correlation with each said advertiser identifier;

generating a marketing database containing contact information of individuals who received said tags bearing a common advertiser identifier.

3. An advertising system for providing an advertiser with a marketing database, said system comprising:

a plurality of tags, each tag having a first portion bearing an advertisement, a second portion bearing a contact identifier and a third portion bearing a tag identifier, said tags being distributed to at least one of a plurality of individuals;

means for obtaining from each said individual having received a tag, said tag identifier and contact information sufficient to contact said individual;

means for incorporating said contact information and corresponding tag identifier into an information storage and retrieval system to generate a master database;

means for extracting data from said master database to generate a marketing database which contains said contact information of at least one said individual having received said tag but not said corresponding tag identifier; and means for transmitting at least a portion of said marketing database to an advertiser whose advertisement appears on said first portion of said tag.

* * * * *